UNITED STATES PATENT OFFICE.

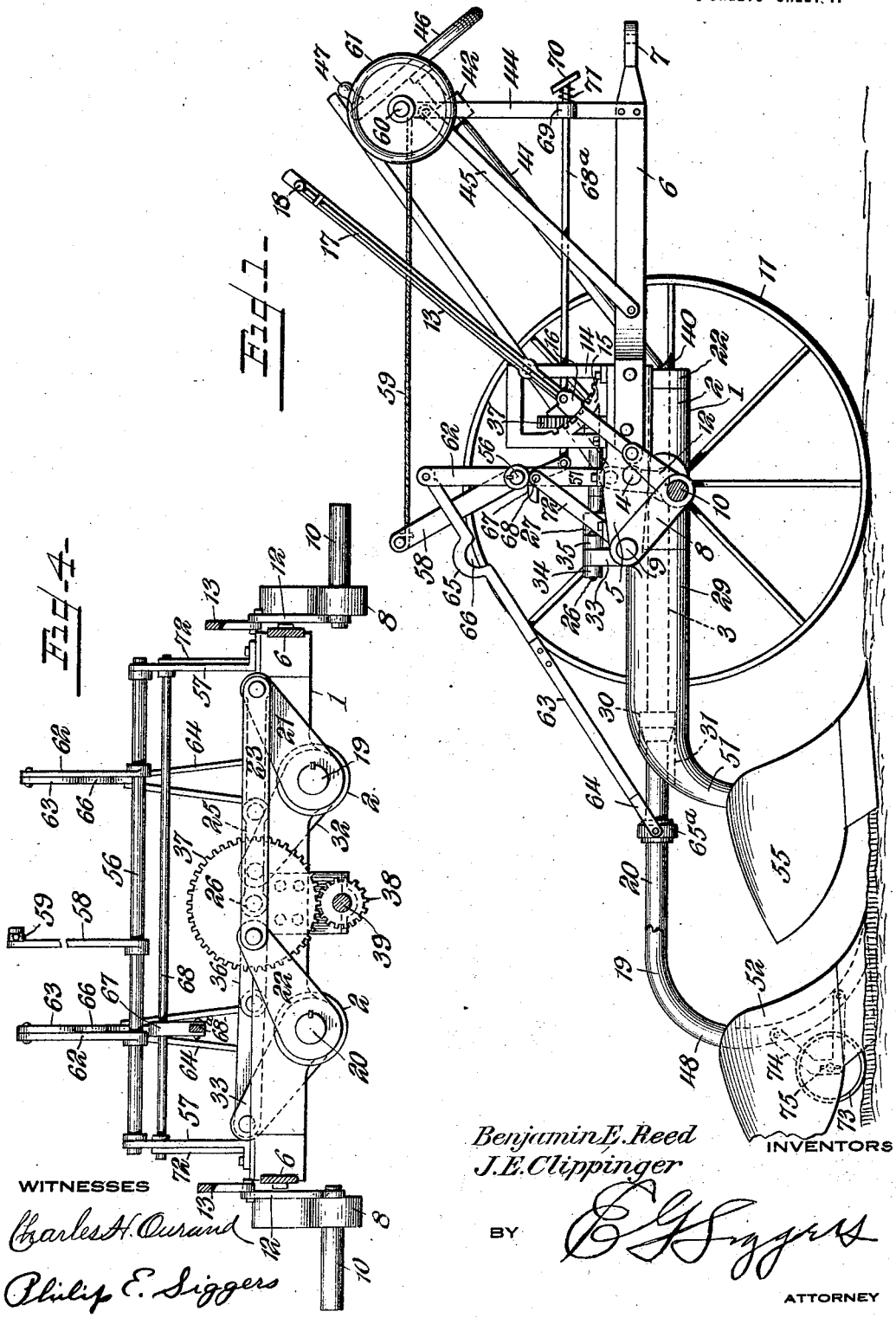

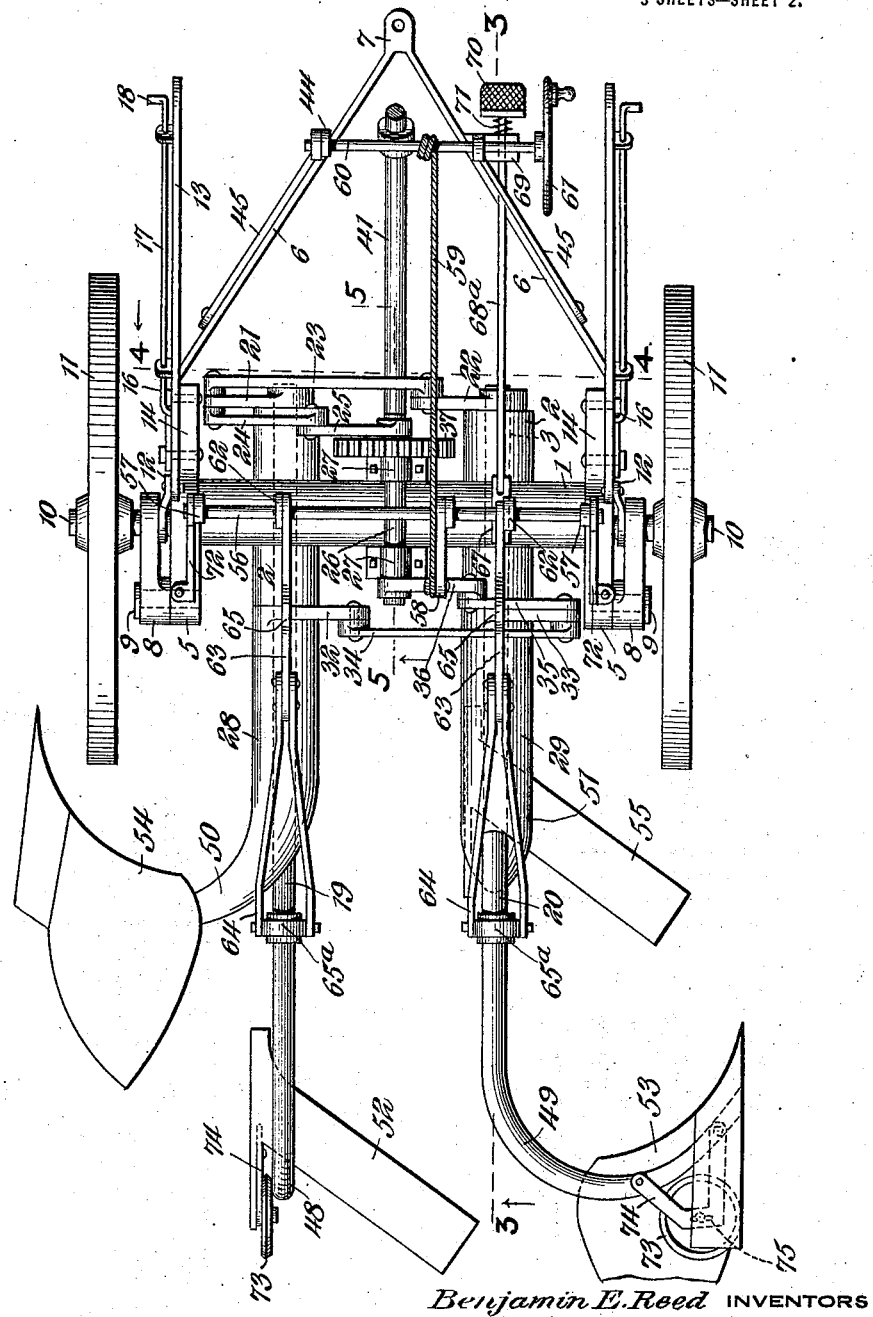

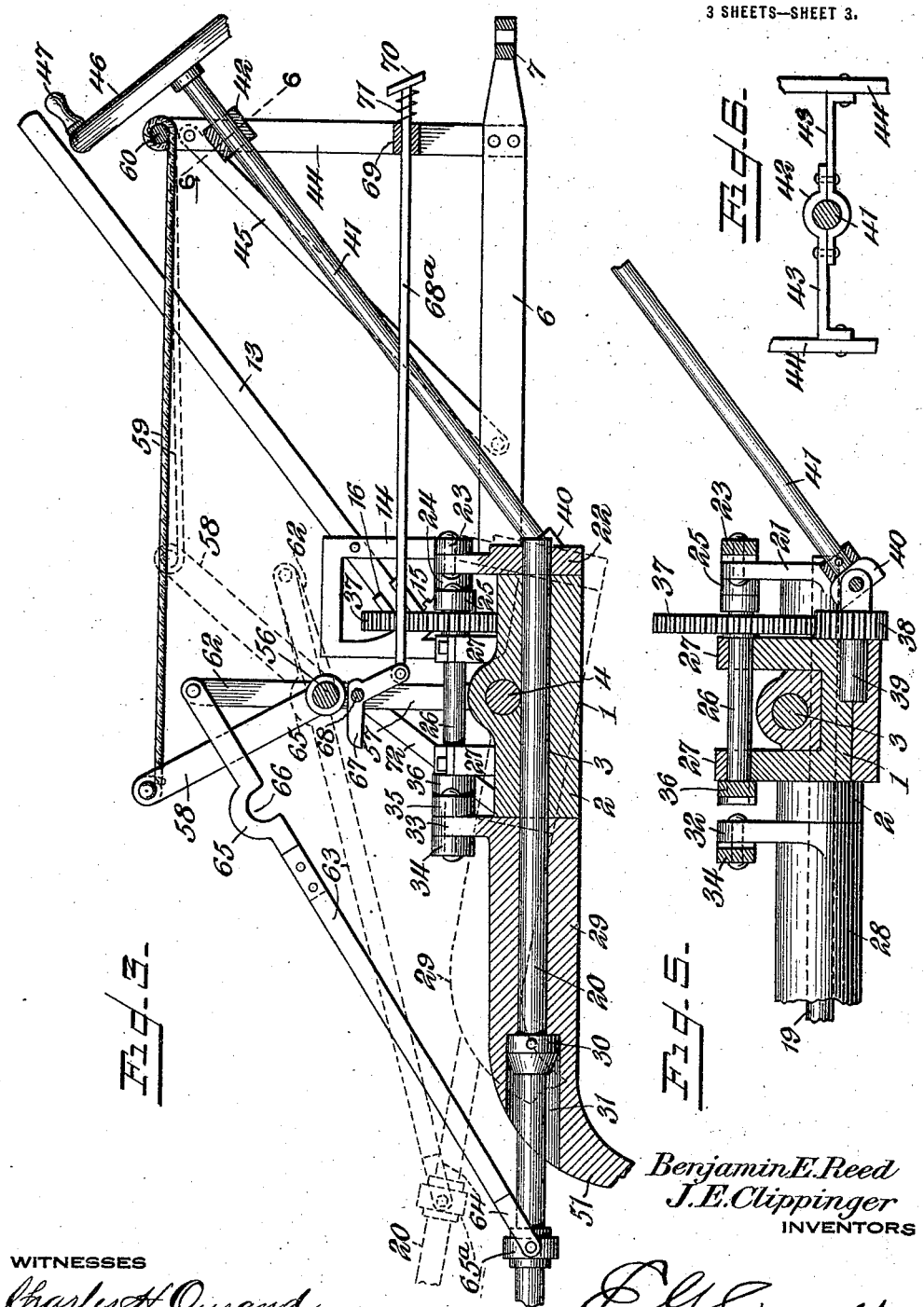

BENJAMIN E. REED, OF RIDGELY, MARYLAND, AND JOHN E. CLIPPINGER, OF PHILADELPHIA, PENNSYLVANIA.

TRACTOR PLOW.

1,420,576.  Specification of Letters Patent.  Patented June 20, 1922.

Original application filed April 17, 1919, Serial No. 290,729. Divided and this application filed December 3, 1920. Serial No. 428,017.

*To all whom it may concern:*

Be it known that we, BENJAMIN E. REED and JOHN E. CLIPPINGER, citizens of the United States, residing, respectively, at Ridgely, in the county of Caroline and State of Maryland, and Philadelphia, in the county of Philadelphia and State of Pennsylvania, have invented a new and useful Tractor Plow, of which the following is a specification.

This invention relates to tractor plows and particularly to mechanism for raising the plows off the ground so that the implement may be readily transported.

Objects of the invention are to provide a simple mechanism of this character which is self-locking when the plows are raised off the ground so that no amount of jolting will release the plows; and to provide means for throwing off the mechanism when locked.

This case is a division of an application filed by us April 17, 1919, Serial No. 290,729, which application was allowed October 21, 1920.

The invention will be best understood from a consideration of the following detailed description taken in connection with the accompanying drawings forming part of this specification, with the understanding, however, that the invention is not confined to any strict conformity with the showing of the drawings, but may be changed and modified so long as such changes and modifications mark no material departure from the salient features of the invention as expressed in the appended claims.

In the drawings:—

Fig. 1 is an elevation of the tractor plow, with some near parts removed to avoid hiding more distant parts.

Fig. 2 is a plan view of the tractor plow, with one set of the plows in active position and the other set lifted out of active position.

Fig. 3 is a section on the line 3—3 of Fig. 2, omitting some distant parts.

Fig. 4 is a section on the line 4—4 of Fig. 2.

Fig. 5 is a section on the line 5—5 of Fig. 2, omitting some distant parts.

Fig. 6 is a section on the line 6—6 of Fig. 3.

Referring to the drawing, there is shown a casting 1 having projections 2 from opposite sides with passages 3 therethrough. To one side of the projections 2 and extending lengthwise of the housing is an arbor 4 projecting beyond the ends of the housing. Keyed to each end of the arbor 4 is a casting 5 projecting forwardly and rearwardly therefrom. At the forward ends of the castings 5 there are secured the rear ends of a yoke 6, with the sides approaching and ultimately uniting at 7 and there shaped to receive a link or other connection with a tractor.

To the rear end of each casting 5 there is connected one end of an arm 8 by means of a pin 9 constituting a pivot for the arm 8. The other end of the arm 8 has a stub axle 10 fast thereto and each stub axle carries a wheel 11 which may constitute either the furrow wheel or the land wheel. Mounted at one end upon each stub axle is a link 12, the other end of which is connected to one end of a lever 13 pivoted to a frame 14 erected on the forward part of the casting 5. The frame 14 is provided with a toothed segment 15 curved about the axis of the pivot of the lever 13, and the lever carries a locking pawl 16 under the control of an operating rod 17 terminating in a manipulating end 18 adjacent to that end of the lever 13, remote from the pawl or latch. There are two such levers and lock means therefor, one lever for each stub axle, so that the stub axles may be independently raised and lowered.

Extending through the passages 3 in the main housing 1 are rock shafts 19 and 20 respectively, constituting plow beams. At the forward end the rock shafts carry rock arms 21, 22 respectively, connected at the ends remote from the shafts by a link 23. One of the rock arms, say the rock arm 21, is connected by another link 24 to the outer end of a rock arm 25 made fast at the inner end to a shaft 26 extending lengthwise of the machine and mounted in bearings 27 carried by the main housing 1. The two rock shafts or plow beams 19 and 20 extend through respective plow beams 28 and 29 at the rear of the projections 2, and each shaft 19 and 20 has a collar 30 fast thereto and located in a counterbore 31 of the beam 28 or 29, the shaft extending rearwardly beyond the beam. In this manner, each shaft 19 and 20 is mounted to rock in the main housing 1 and each beam 28 and 29 is mounted to rock upon the respective shaft 19 or 20, and is held from longitudinal movement on the shaft by the housing 1 at the forward end and the collar 30 at the rear end.

The beam 28 is provided with an arm 32 projecting from one side thereof and the beam 29 has a similar arm 33, the two arms being connected together by a link 34 so as to move simultaneously to the same extent. Pivoted to the arm 33 is a link 35 in turn connected to an arm 36 fast to the shaft 26 and projecting therefrom in a direction opposite to the direction of projection of the arm 25 from the same shaft.

Mounted on and fast to the shaft 26 is a gear wheel 37 in mesh with a pinion 38 carried by and fast to the short shaft 39 journaled in the main housing 1. Coupled to the shaft 39 by a universal joint 40 is a rod 41 carried forwardly and upwardly at a suitable angle and passed through a journal bearing 42 having side extensions 43 secured to uprights 44 rising from the yoke 6 and held steady by braces 45. The rod 41 carries a manipulating wheel 46 at its upper end which carries a handle 47 whereby the rod 41 may be rotated. This rotates the pinion 38, which in turn causes rotation of the gear wheel 37 and shaft 26 carrying it.

The rear end of each shaft 19 and 20 carries or is shaped into a plow standard 48 and 49, respectively. The rear end of each beam 28 and 29 is shaped into a plow standard 50 and 51, respectively. These plow standards carry plows 52, 53, 54 and 55, two of which, the plows 52 and 55, are right hand plows, and the other two of which, namely 53 and 54, are left hand plows. It will be understood, of course, that the particular number and arrangement of plows is not obligatory.

When the plowing operation is proceeding, two of the plows, say the right hand plows, are set to enter the ground and the other two plows are elevated so as to be out of operation, those plows out of operation being shown in the drawings as the left hand plows. When the tractor plow has traveled from one side, or one end, of the field to the other, the machine is turned around and started back upon unplowed ground next to the furrows just previously produced. Then the right hand plows 52 and 55 are lifted to the inoperative position and the left hand plows 53 and 54 are dropped to the operative position, whereupon, the plowing proceeds as before but in the opposite direction.

The mechanism so far described is described with greater particularity and is claimed in the parent application. The present invention is limited to the means designed to raise the plows from the ground so that the structure may be transported from place to place.

There is provided a shaft 56 extending transversely of the machine and mounted at the ends in standards 57 erected on the castings 5. The shaft carries an arm 58 rising therefrom and to this arm there is attached one end of a stand 59, such as a manila or wire rope. The other end of the strand 59 is wound upon a drum 60 carried by the uprights 44, the drum constituting part of a shaft journaled in suitable bearings in the uprights 44 and carrying at one end a hand wheel 61. The shaft 56 is provided with upstanding arms 62 in line with the shafts 19 and 20, respectively, and each arm has pivoted to its upper end one end of a link 63 having the other end divided, as shown at 64, to straddle a swivel connection 65ª fast on the shaft 19 or 20, as the case may be. At a suitable point in its length the link 64 is formed with a bowed portion 65 forming a recess 66 shaped to engage over the shaft 56. The arrangement is such that on rocking the shaft 56 in a direction to move the arms 62 forwardly the bowed portion 65 is brought over the shaft 56 into engagement therewith, forming an alined lock. At the same time the shafts 19 and 20 are rocked about the arbor 4 to an extent raising all the plows bodily from the ground. The lock is of the over-center type so that unless purposely disturbed the lock will hold during transportation of the machine from place to place. In order to move the lock from the holding to the inactive position, a throw-off, in the form of an angle lever, 67 is provided, this lever being mounted upon a rod 68 extending between the uprights 57. The throw-off 67 has fast thereto a rod 68ª extending forwardly and carried by a guide 69 on one of the uprights or standards 44. The rod 68ª terminates in a pedal 70 between which and the guide 69 there is interposed a spring 71 tending to hold the throw-off lever 67 in the inactive position. The uprights 57 are strengthened by braces 72.

The two plows carried by the shafts 19 and 20 are provided with depth wheels 73, being connected to the plows by brackets 74, shown in Figs. 1 and 2. It is unnecessary to provide the other two plows with depth wheels, since the depth wheel 73 of each plow 52 or 53, as the case may be, sustains the other active plow in proper working position. For this reason the windlass, comprising the shaft 60 with its hand wheel 61, needs no particular holding means in the nature of a pawl and ratchet in order to prevent the plows from entering more deeply than desired into the ground. The depth to which the plows will enter the ground may be changed by adjusting the brackets 74, each of which has a slot 75 permitting up and down adjustment of the depth wheel 73.

What is claimed is:—

1. In a plow structure, a rockable body member mounted on an axis transverse of the structure, plow beams carried by the rockable body member and participating in the rocking movements thereof, and means for causing said rocking movements comprising a rock shaft, arms fast to and radiating from the rock shaft, means for causing the rocking of the rock shaft, and links connecting the arms to the plow beams, and means located between the ends of the links and engageable over the rocker shaft for locking the rockable body in an elevated position.

2. In a plow structure, a rockable body member mounted on an axis transverse of the structure, plow beams carried by the rockable body member and participating in the rocking movements thereof, and means for causing said rocking movements comprising a rock shaft, arms fast to and radiating from the rock shaft, means for causing the rocking of the rock shaft, and links connecting the arms to the plow beams, each link being shaped to form a socket or recess to engage over the shaft to lock the plow beams in the elevated position.

3. In a plow structure, a rockable body member mounted on an axis transverse of the structure, plow beams carried by the rockable body member and participating in the rocking movements thereof, and means for causing said rocking movements comprising a rock shaft, arms fast to and radiating from the rock shaft, means for causing the rocking of the rock shaft, and links connecting the arms to the plow beams, each link being shaped to form a socket or recess to engage over the shaft to lock the plow beams in the elevated position, and a throw-off lever associated with one of the links to lift the latter and thereby rock the shaft to move both links to the unlocked position.

4. In a plow structure, plow beams rockable about an axis transverse of the structure, and means for rocking the plow beams and locking them in the elevated position, comprising a rock shaft, arms radiating therefrom, and links connecting the plow beams with the arms, with each link having a portion shaped to engage over the shaft when the arms are in substantially parallel relation with the links, to provide a dead center lock.

5. In a plow structure, plow beams rockable about an axis transverse of the structure, and means for rocking the plow beams and locking them in the elevated position, comprising a rock shaft, arms radiating therefrom, and links connecting the plow beams with the arms, with each link having a portion shaped to engage over the shaft when the arms are in substantially parallel relation with the links, to provide a dead center lock, said lock structure having a throw-off means comprising an angle lever associated with one of the links for engaging it in the locked position, and manipulating means for the angle lever, whereby it may be moved to lift the locked link from the shaft and thereby release the plow beams.

In testimony that we claim the foregoing as our own, we have hereto affixed our signatures.

BENJAMIN E. REED.
JOHN E. CLIPPINGER.